(12) United States Patent
Moustgaard et al.

(10) Patent No.: US 8,549,875 B2
(45) Date of Patent: Oct. 8, 2013

(54) MODULAR VALVE

(75) Inventors: Allan Juhl Moustgaard, Soenderborg (DK); Sune Prytz, Soenderborg (DK); Hans Kurt Petersen, Egtved (DK)

(73) Assignee: Danfoss A/S, Nordborg (DK)

( * ) Notice: Subject to any disclaimer, the term of this patent is extended or adjusted under 35 U.S.C. 154(b) by 784 days.

(21) Appl. No.: 12/663,577

(22) PCT Filed: Jun. 17, 2008

(86) PCT No.: PCT/DK2008/000221
§ 371 (c)(1),
(2), (4) Date: Jun. 16, 2010

(87) PCT Pub. No.: WO2008/154921
PCT Pub. Date: Dec. 24, 2008

(65) Prior Publication Data
US 2010/0293990 A1 Nov. 25, 2010

(30) Foreign Application Priority Data

Jun. 19, 2007 (DK) .................................. 2007 00882

(51) Int. Cl.
*F25B 41/06* (2006.01)
(52) U.S. Cl.
USPC .......................................................... 62/527
(58) Field of Classification Search
USPC ............................. 62/498, 511, 527; 251/304
See application file for complete search history.

(56) References Cited

U.S. PATENT DOCUMENTS

| 2,144,898 A | 1/1939 | Shrode |
| 2,432,859 A | 12/1947 | Carter |
| 2,832,666 A * | 4/1958 | Hertzberg et al. ............ 423/407 |

(Continued)

FOREIGN PATENT DOCUMENTS

| JP | 6068575 A | 3/1994 |
| JP | 2000055510 A | 2/2000 |

(Continued)

OTHER PUBLICATIONS

International Search Report for PCT/DK2008/000221 dated Sep. 26, 2008.

(Continued)

*Primary Examiner* — Melvin Jones
(74) *Attorney, Agent, or Firm* — McCormick, Paulding & Huber LLP

(57) ABSTRACT

The invention provides a valve comprising a house and a drum rotatable in the house. The house comprises a plurality of substantial identical tubular mid-section house members, a bottom house member, and a top house member. When connecting the house members to each other, a continuous outer wall surrounding a house cavity, a port, and a plurality of nozzles being in fluid communication with the house cavity is provided. The drum comprises a plurality of substantial identical tubular mid-section drum members, a bottom drum member, and a top drum member. When connecting the drum members to each other, an inner wall having an outer surface being adapted for rotation in contact with a corresponding inner surface of the outer wall, the inner wall comprising a plurality of conduits is provided. During rotation of the drum, the conduits can be brought into and out off fluid communication with the nozzles in order to provide passages between the port and the nozzles. Furthermore, the invention provides a set of members to form a valve, and a system for thermal exchange.

10 Claims, 4 Drawing Sheets

(56) References Cited

U.S. PATENT DOCUMENTS

| | | | |
|---|---|---|---|
| 3,152,453 A * | 10/1964 | Hamilton | 62/71 |
| 3,967,782 A | 7/1976 | Eschbaugh et al. | |
| 4,574,840 A | 3/1986 | Schumann et al. | |
| 5,517,800 A | 5/1996 | Brenner | |
| 5,819,798 A * | 10/1998 | Claflin et al. | 137/625.11 |
| 5,832,744 A | 11/1998 | Dorste et al. | |

FOREIGN PATENT DOCUMENTS

| | | |
|---|---|---|
| JP | 2003004340 A | 1/2003 |
| JP | 2005003190 A | 1/2005 |
| WO | 2006/097892 A2 | 9/2006 |
| WO | 2006/116999 A1 | 11/2006 |

OTHER PUBLICATIONS

Co-pending U.S. Appl. No. 12/664,717 entitled "An Expansion Valve with a Distributor" filed Dec. 15, 2009.

* cited by examiner

US 8,549,875 B2

MODULAR VALVE

CROSS REFERENCE TO RELATED APPLICATIONS

This application is entitled to the benefit of and incorporates by reference essential subject matter disclosed in International Patent Application No. PCT/DK2008/000221 filed on Jun. 17, 2008 and Danish Patent Application No. PA 2007 00882 filed Jun. 19, 2007.

FIELD OF THE INVENTION

The invention relates to a valve comprising a house forming a cavity with a port and a plurality of nozzles. The invention further relates to a system for thermal exchange, e.g. a heating system or a refrigeration system e.g. for climate control in a building. The system comprises a circuit with a compressor, a condenser, a valve, and at least two evaporators fluidly connected in parallel between the valve and a common outlet, the valve being arranged to distribute a flow of a refrigerant between the compressor and the evaporators.

BACKGROUND OF THE INVENTION

A refrigeration system is known e.g. from U.S. Pat. No. 5,832,744. The system comprises a distribution valve arranged between a port for the refrigerant and a plurality of nozzles for the refrigerant.

SUMMARY OF THE INVENTION

To improve the existing valves and thermal exchange systems incorporating such valves, the present invention provides in a first aspect a valve comprising a house and a drum rotatable in the house, wherein the house comprises a plurality of substantial identical tubular mid-section house members, a bottom house member, and a top house member, the house members being connected to each other to provide a continuous outer wall surrounding a house cavity, a port, and a plurality of nozzles being in fluid communication with the house cavity, and wherein the drum comprises a plurality of substantial identical tubular mid-section drum members, a bottom drum member, and a top drum member, the drum members being connected to each other to provide an inner wall having an outer surface being adapted for rotation in contact with a corresponding inner surface of the outer wall, the inner wall comprising a plurality of conduits which, during rotation of the drum, can be brought into and out off fluid communication with the nozzles in order to provide passages between the port and the nozzles.

In one embodiment, the house cavity is only present when the house members are connected without having the drum members connected and positioned inside the house cavity, since the drum may substantially fill out the house cavity and thus move in close contact with the inner surface of the outer wall defining the house cavity.

The valve may control flow between the port and the nozzles via the conduits. By rotation of the drum, the flow out of the valve may be changed from one nozzle to another. By a rotation of the drum, each of the nozzles and the conduits may alternatingly come in line with each other. Thus, the conduits may be arranged so that they individually can be brought in fluid communication with the nozzles during rotation of the drum in order to provide passage between the port and different nozzles depending on the positions of the drum in the house.

The conduits may be evenly distributed over the inner wall. As an example, each mid-section drum members may comprise one conduit. Furthermore, the conduits may be distributed evenly around a centre axis of the drum, thus the conduits may be distributed along a line being coil-shaped. If the nozzles formed in the outer wall, i.e. in the house members, are lengthwise evenly distributed, and distributed along a straight line parallel to the centre axis of the house, rotation of the drum in the house may cause alternating employment of each of the conduits and the nozzles. During rotation, one conduit and one nozzle may be brought into fluid communication with each other and subsequently be brought out off fluid communication. These steps may be followed by another conduit being brought into fluid communication with another nozzle and subsequently being brought out off fluid communication herewith, thus allowing for stepwise fluid communication between the port and the nozzles via the conduits. If a larger fluid communication is requested, the rotation of the drum may be stopped to ensure fluid communication between one conduit and one nozzle.

In another embodiment, the conduits and or the nozzles may be grouped in pairs. These pairs may also be evenly distributed. The conduits and the nozzles may also form other patterns in other embodiments, patterns being evenly or non-evenly distributed.

By applying a number of substantially identical tubular mid-section members, both with regard to the house and the drum, it is possible to obtain a valve with an arbitrary number of nozzles facilitating distribution e.g. to an arbitrary number of evaporators in a thermal exchange device such as a refrigeration system.

By substantial identical tubular mid-section house members is in this connection meant mid-section house members having inner tubular dimensions being substantial identical, thus being able to form a house having a continuous outer wall with a uniform inner surface. Likewise, is by substantial identical tubular mid-section drum members meant mid-section drum members having outer tubular dimensions being substantial identical, thus forming a drum having a uniform outer surface. The mid-sections may thus be differently shaped so that they are adapted for mutual connection in order to form a house and a drum respectively.

The nozzles being formed in the house and the conduits formed in the inner wall may be of a different size which may be especially relevant if the valve is used in connection with a refrigeration system having evaporators of a different size. The different mid-section house members and different mid-section drum members may therefore be coloured differently in order to be able to differentiate between them. Additionally, the nozzles and/or the conduits may be shaped differently allowing for e.g. both circular and oval shapes.

The inner wall may surround an inner cavity, i.e. the drum may be formed as a hollow tube having an inner cavity extending along the length of the valve. In these embodiments, the conduits may provide passage between the outer surface and the inner cavity, i.e. the conduits may provide passage through a side wall of the hollow tube. As the drum comprises a number of drum elements, each of these drum elements may be formed as a section of a hollow tube, and some or all of these sections may comprise one or more conduits.

In some embodiments, the port may be in fluid communication with the inner cavity, thus the flow into the valve may be through one end of the valve, whereas the flow out of the valve may be transverse to the length of the valve, thus being able to provide a compact oblong valve of variable length dependent on the number of house members and drum members applied, which number may be dependent on the number of evaporators in a refrigeration system to which the valve may be connected.

In a second aspect, the invention provides a set of members to form a valve, wherein the set comprises a first set of house members and a second set of drum members, the first set of house members comprising a plurality of substantial identical tubular mid-section house members, a bottom house member, and a top house member, the house members being connectable to each other to provide a house having a continuous outer wall surrounding a house cavity, a port, and a plurality of nozzles being in fluid connection with the house cavity, and wherein the second group of drum members comprises a plurality of substantial identical tubular mid-section drum members, a bottom drum member, and a top drum member, the drum members being connectable to each other to provide a drum having an inner wall having an outer surface being adapted for rotation in contact with a corresponding inner surface of the outer wall and comprising a plurality of conduits which, during rotation of the drum in the house, can be brought in fluid communication with the nozzles in order to provide passages between the port and the nozzles.

It should be understood, that the above-mentioned features of the first aspect of the invention may also be applicable to the second aspect of the invention.

Each of the tubular mid-section house members and each of the tubular mid-section drum members may comprise a first and a second oppositely oriented end surface. A first end surface of one mid-section house member may be positioned next to a second end section of another mid-section house member when forming a house of the mid-section members. This may likewise be the case for the mid-section drum members. In order to be able to connect the house members and to connect the drum members and thus form a house and a drum, each end surface may comprise a connection member adapted for connection with an adjacent tubular mid-section member or an end member.

The connection members may comprise different forms of groove and tongue connections, connections comprising a protrusion and an indentation in engagement with each other, toothed connections, magnetic connections and the like. Thus, the one of the end surfaces may comprise a connection member of a first type and the other of the end surfaces may comprise a connection member of a second type, the connection members of the first and the second type being different and being adapted to co-operate for mutual connection.

The connection members may prevent mutual axial displacement between adjacent house members and adjacent drum members, thus the house and the drum may both remain connected when connected and forming a valve.

The connection members may furthermore prevent mutual disconnection of adjacent house members and adjacent drum members during rotation of the drum in the house, i.e. during operation of the valve.

In a third aspect, the invention provides a system for thermal exchange, the system comprising a circuit for a refrigerant, the circuit comprising a compressor, a condenser, a valve, and evaporation means comprising at least two conduits fluidly connected in parallel between the valve and a common outlet, the valve being arranged to distribute a flow of a refrigerant between the compressor and the evaporators, the valve being provided in accordance with the first aspect of the invention.

The evaporation means may e.g. comprise several separate evaporators forming several separate cooling elements or forming one united cooling element, or it may be one single evaporator with several separate passages for the refrigerant to flow in separate parallel streams through the evaporator.

It should be understood that the above-mentioned features of the first and second aspects of the invention may also be applicable to the valve of the third aspect of the invention.

BRIEF DESCRIPTION OF THE DRAWINGS

In the following, preferred embodiments of the invention will be described in further details with reference to the drawing in which.

DETAILED DESCRIPTION OF THE PREFERRED EMBODIMENTS

Figure 1:
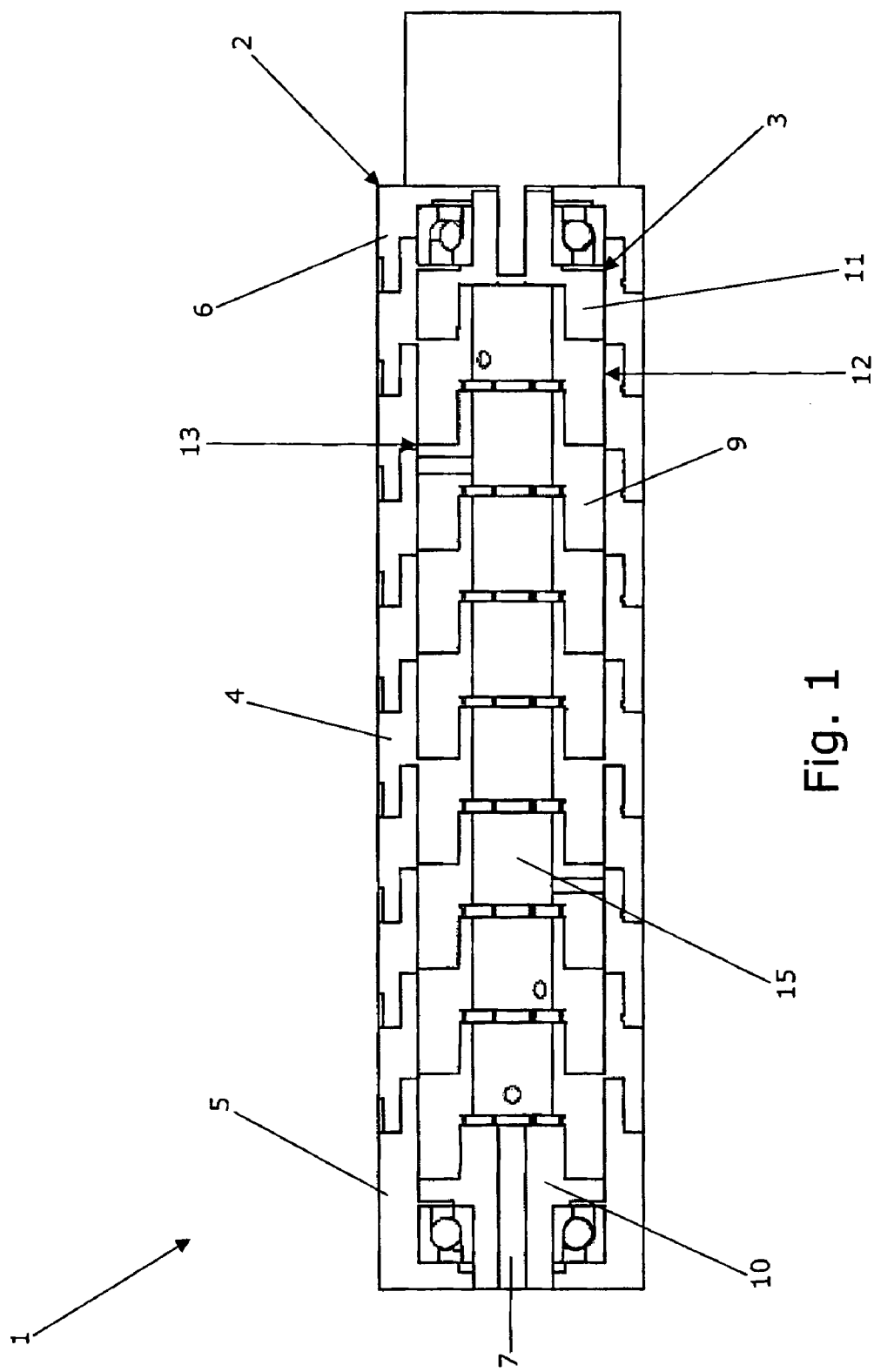
FIG. 1 is a cross-sectional view of a valve according to the invention.

FIG. 1 is a cross-sectional view of a valve 1 comprising a house 2 and a drum 3 rotatable in the house 2. The house 2 comprises eight substantial identical tubular mid-section house members 4, a bottom house member 5, and a top house member 6. The house members 4, 5, 6 are connected to each other to provide a continuous outer wall surrounding a house cavity (not shown, as the drum 3 is situated in the house cavity). Furthermore, the house members 4, 5, 6 provide a port 7 and a plurality of nozzles 8 (see FIGS. 4a+4b). The port 7 and nozzles 8 are in fluid communication with the house cavity.

The drum 3 comprises nine substantial identical tubular mid-section drum members 9, a bottom drum member 10, and a top drum member 11. The drum members 9, 10, 11 are connected to each other to provide an inner wall having an outer surface 12 which is adapted for rotation in contact with a corresponding inner surface 13 of the outer wall 2. The inner wall comprises a plurality of conduits 14 (see FIG. 3). During rotation of the drum 3, the conduits 14 can be brought into and out off fluid communication with the nozzles 8 in order to provide passages between the port 7 and the nozzles 8.

The inner wall 3 surrounds an inner cavity 15 which is in fluid communication with the port 7. Furthermore, the conduits 8 provide passage between the outer surface 12 and the inner cavity 15, and thus between the port 7 and the nozzles 8.

Figure 2:
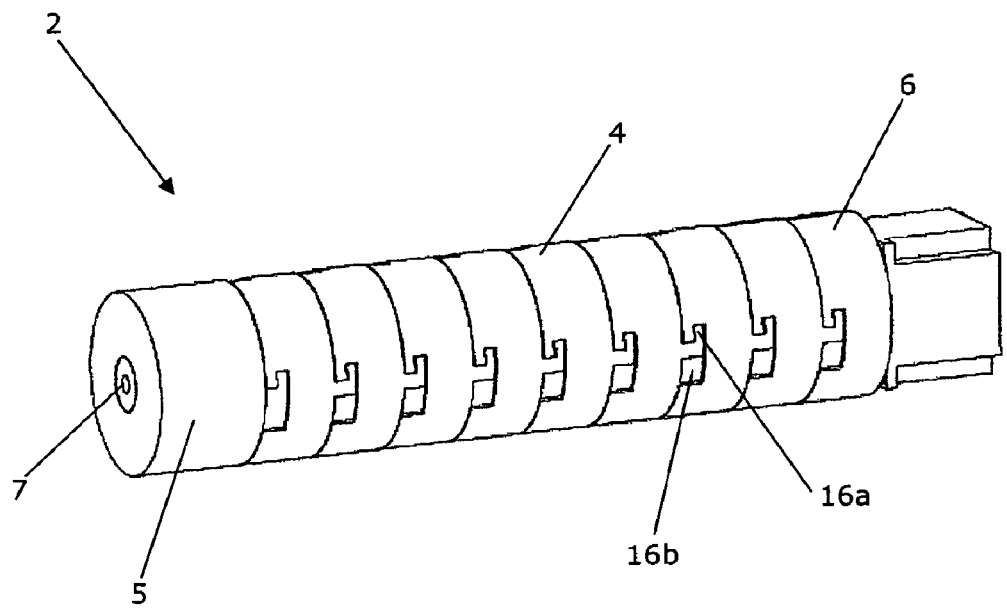
FIG. 2 illustrates a house according to the invention.

FIG. 2 illustrates an embodiment of a house 2 according to the invention. The house 2 comprises eight mid-section house members 4, a bottom house member 5 and a top house member 6.

Figure 4A:
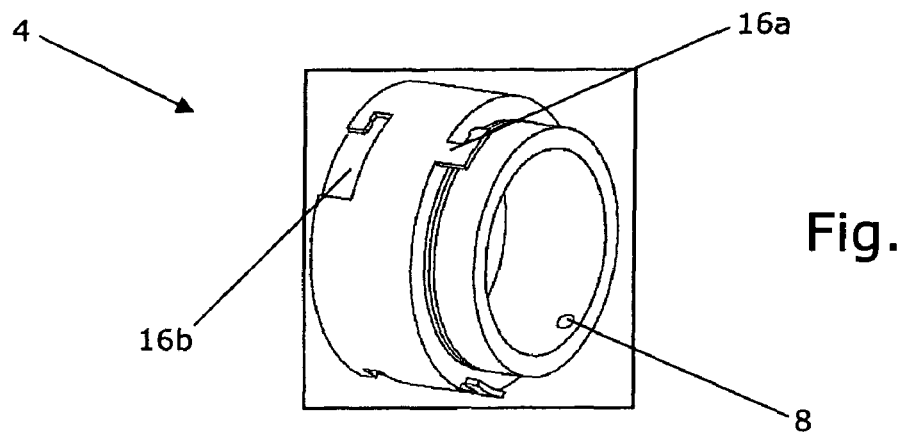
FIGS. 4a-4c illustrate house members according to the invention.

Each of the tubular mid-section house members 4 comprises a first and a second opposite oriented end surface (not shown). Each first end surface of a mid-section house member 4 is positioned adjacent to a second end surface of another mid-section house member 4 or to an end surface of an end house member, the end house member being the bottom house member 5 or the top house member 6. As illustrated in FIG. 2, each end surface of the mid-section house members 4 comprises a connection member 16a/16b adapted for connection with an adjacent tubular mid-section house member 4 or an end house member 5, 6. FIGS. 4a and 4c illustrate the connection members 16a, 16b in more detail.

In the illustrated embodiment, the first connection member 16a is a protrusion being L-shaped, and the second connection member 16b is an L-shaped indentation in the outer surface of the house member 4. The connection members 16a, 16b are connected by inserting the L-shaped protrusion 16a in the L-shaped indentation 16b and subsequently rotating one of the house members 4 to secure the first connection member 16a in the second connection member 16b.

Figure 3:
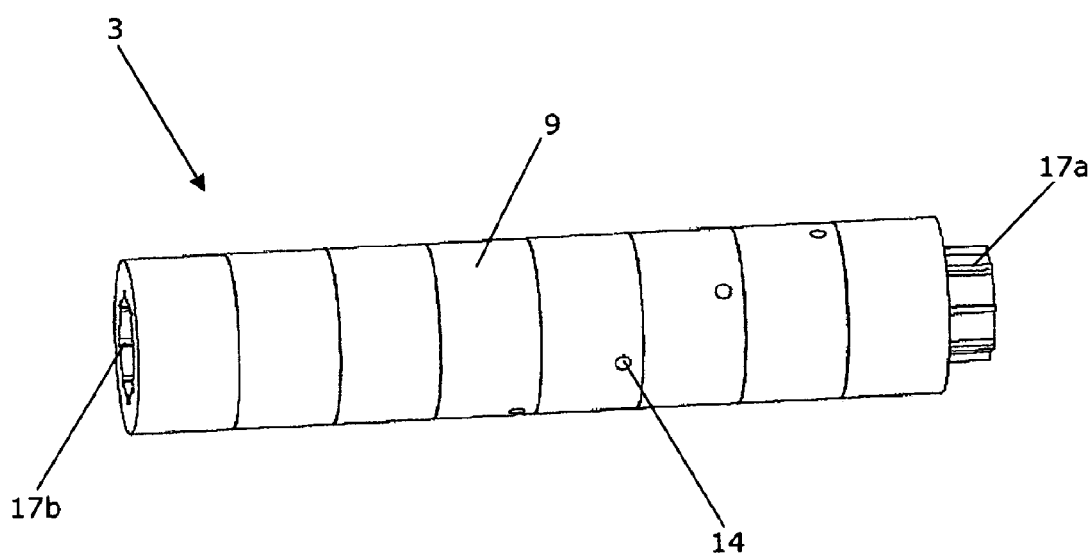
FIG. 3 illustrates a drum according to the invention.

FIG. 3 illustrates an embodiment of a drum 3 according to the invention. The drum 3 comprises eight mid-section drum members 9. The bottom drum member 10 and a top drum member 11 are not shown. A conduit 14 is shown on some of the mid-section drum members 9. In this embodiment, the conduits 14 are evenly distributed over at the inner wall 2, and each mid-section drum member 9 comprises a conduit 14. Furthermore, the conduits 14 are distributed evenly around the lengthwise centre axis of the drum 3. Thus in this embodiment, the conduits 14 are distributed along a line being coil-shaped.

Each of the tubular mid-section drum members 9 comprises a first and a second opposite oriented end surface (not shown). Each first end surface of a mid-section drum member 9 is positioned adjacent to a second end surface of another mid-section drum member 9 or to an end surface of an end drum member, the end drum member being the bottom drum member 10 or the top drum member 11. For details of the drum connection members, see FIGS. 5a-5c.

Figure 4B:
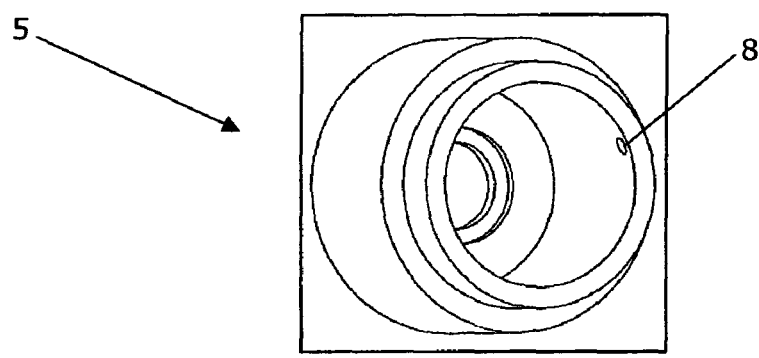
Figure 4C:
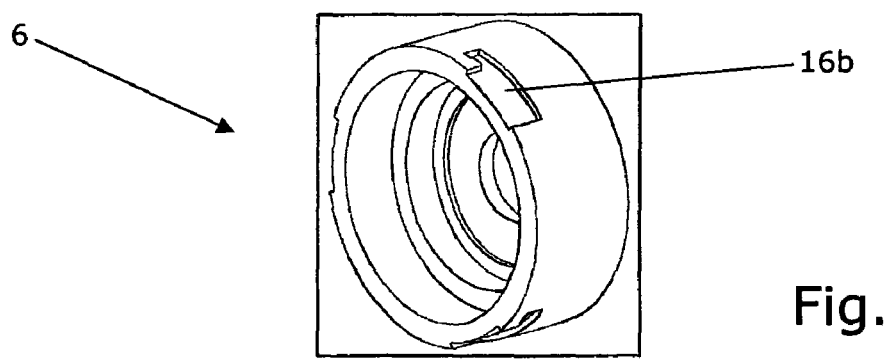

FIGS. 4a-4c illustrate house members 4, 5, 6. As illustrated by FIG. 4a, the mid-section house member 4 comprises a nozzle 8, and three connection members 16a, 16b (only two of them are shown). FIG. 4b illustrates a bottom house member 5 with a nozzle 8. The connection members 16a are not shown. FIG. 4c illustrates a top house member 6 having three connection members 16b.

Figure 5A:
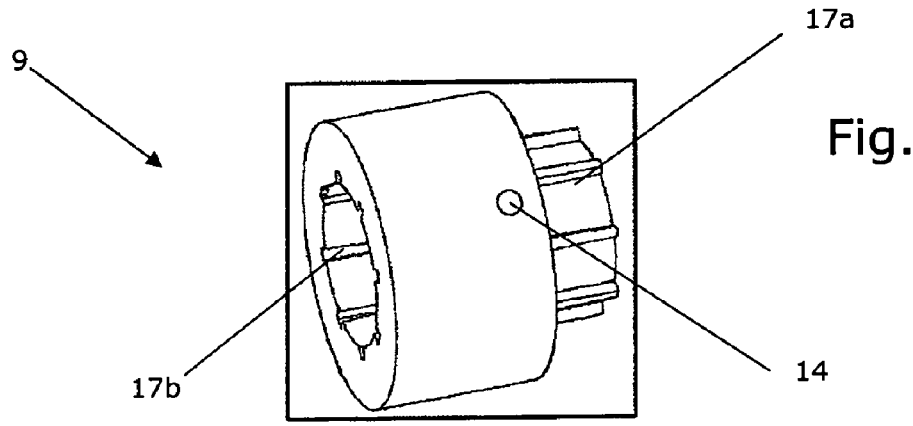
FIGS. 5a-5c illustrate drum members according to the invention.
Figure 5B:
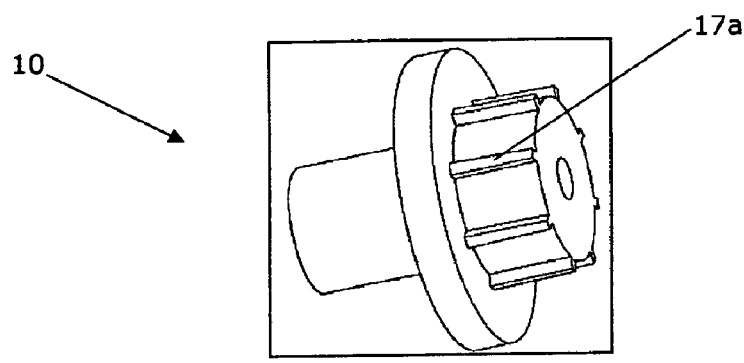
Figure 5C:
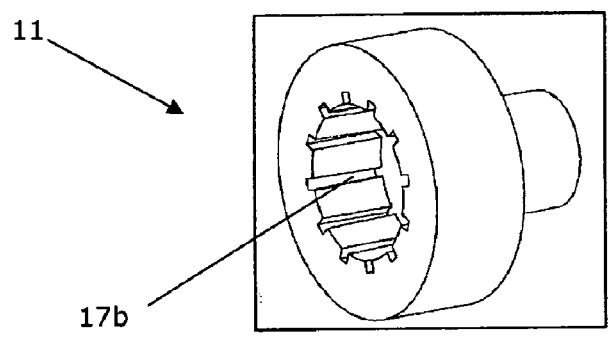

FIGS. 5a-5c illustrate drum members 9, 10, 11. As illustrated by FIG. 5a, the mid-section drum member 9 comprises a conduit 14, and connection members 17a, 17b. Each end surface of the mid-section drum members 9 comprises a connection member 17a/17b adapted for connection with an adjacent tubular mid-section drum member 9 or an end drum member 10, 11.

In the illustrated embodiment, the first connection member 17a is a toothed protrusion, and the second connection member 17b is a toothed indentation in the inner surface of the drum member 9. The connection members 17a, 17b are connected by inserting the toothed protrusion 17a in the toothed indentation 17b to secure the first connection member 17a in the second connection member 17b.

FIG. 5b illustrates a bottom drum member 10 with a connection member 17a, whereas FIG. 5c illustrates a top drum member 11 having a connection member 17b.

While the present invention has been illustrated and described with respect to a particular embodiment thereof, it should be appreciated by those of ordinary skill in the art that various modifications to this invention may be made without departing from the spirit and scope of the present.

What is claimed is:

1. A valve comprising a house and a drum rotatable in the house, wherein the house comprises a plurality of substantial identical tubular mid-section house members, a bottom house member, and a top house member, the house members being connected to each other to provide a continuous outer wall surrounding a house cavity, a port, and a plurality of nozzles being in fluid communication with the house cavity, and wherein the drum comprises a plurality of substantial identical tubular mid-section drum members, a bottom drum member, and a top drum member, the drum members being connected to each other to provide the drum with an inner wall having an outer surface being adapted for rotation in contact with a corresponding inner surface of the outer wall, the inner wall comprising a plurality of conduits which, during rotation of the drum, can be brought into and out off fluid communication with the nozzles in order to provide passages between the port and the nozzles.

2. The valve according to claim 1, wherein the inner wall surrounds an inner cavity and wherein the conduits provide passage between the outer surface and an inner cavity.

3. The valve according to claim 2, wherein the port is in fluid communication with the inner cavity.

4. The valve according to claim 1, wherein the conduits are arranged so that they individually can be brought in fluid communication with the nozzles during rotation of the drum in order to provide passage between the port and different ones of the nozzles depending on the positions of the drum in the house.

5. A set of members to form a valve, wherein the set comprises a first set of house members and a second set of drum members, the first set of house members comprising a plurality of substantial identical tubular mid-section house members, a bottom house member, and a top house member, the house members being connectable to each other to provide a house having a continuous outer wall surrounding a house cavity, a port, and a plurality of nozzles being in fluid connection with the house cavity, and wherein the second group of drum members comprises a plurality of substantial identical tubular mid-section drum members, a bottom drum member, and a top drum member, the drum members being connectable to each other to provide a drum having an inner wall having an outer surface being adapted for rotation in contact with a corresponding inner surface of the outer wall and comprising a plurality of conduits which, during rotation of the drum in the house, can be brought in fluid communication with the nozzles in order to provide passages between the port and the nozzles.

6. The set of members according to claim 5, wherein each of the tubular mid-section house members and the tubular mid-section drum members comprises a first and a second opposite oriented end surface, and wherein each end surface comprises a connection member adapted for connection with an adjacent tubular mid-section member or an end member.

7. The set of members according to claim 6, wherein the one of the end surfaces comprises a connection member of a first type and the other of the end surfaces comprises a connection member of a second type, the connection members of the first and the second type being different and being adapted to co-operate for mutual connection.

8. The set of members according to claim 6, wherein the connection members prevent mutual axial displacement between adjacent house members and adjacent drum members.

9. The set of members according to claim 6, wherein the connection members prevent mutual disconnection of adjacent house members and adjacent drum members during rotation of the drum in the house.

10. A system for thermal exchange, the system comprising a circuit for a refrigerant, the circuit comprising a compressor, a condenser, a valve, and evaporation means comprising at least two conduits fluidly connected in parallel between the valve and a common nozzle, the valve being arranged to distribute a flow of a refrigerant between the compressor and the evaporators, the valve comprising a house and a drum rotatable in the house, wherein the house comprises a plurality of substantial identical tubular mid-section house members, a bottom house member, and a top house member, the house members being connected to each other to provide a continuous outer wall surrounding a house cavity, a port, and a plurality of nozzles being in fluid communication with the house cavity, and wherein the drum comprises a plurality of substantial identical tubular mid-section drum members, a bottom drum member, and a top drum member, the drum members being connected to each other to provide the drum with an inner wall having an outer surface being adapted for rotation in contact with a corresponding inner surface of the outer wall, the inner wall comprising a plurality of conduits which, during rotation of the drum, can be brought into and out off fluid communication with the nozzles in order to provide passages between the port and the nozzles.

* * * * *